INVENTOR
RALPH F. PENOYER
BY Paul D. Carmichael
ATTORNEY

Nov. 5, 1963 R. F. PENOYER 3,109,935

RESONANT LOGIC CIRCUITS EMPLOYING TUNNEL DIODES

Filed June 29, 1961 3 Sheets-Sheet 2

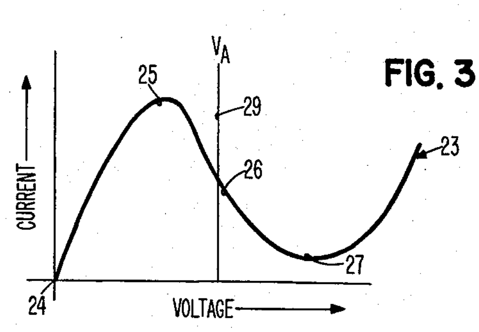
FIG. 3
FIG. 4
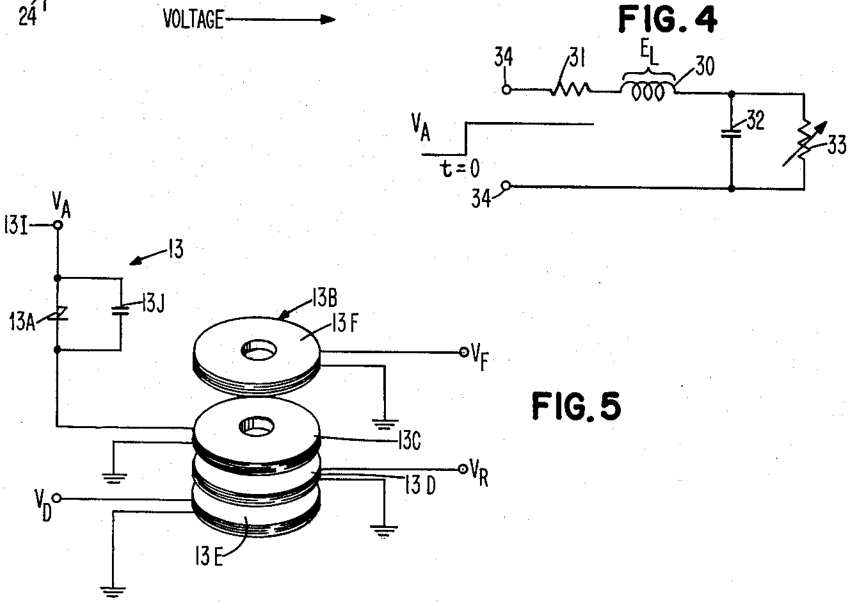
FIG. 4, FIG. 5
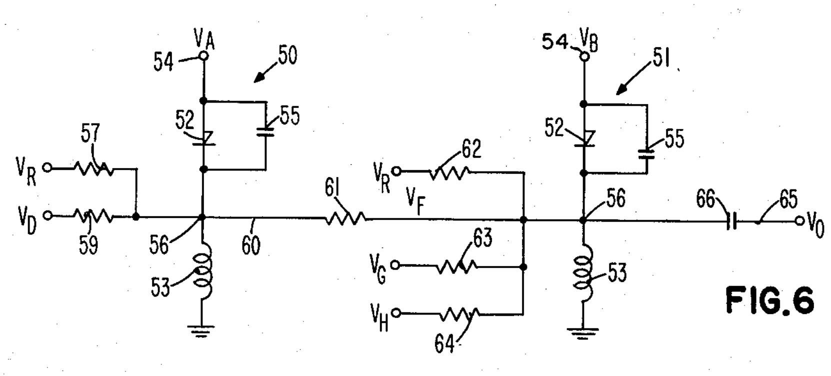
FIG. 6

United States Patent Office 3,109,935

Patented Nov. 5, 1963

3,109,935

RESONANT LOGIC CIRCUITS EMPLOYING TUNNEL DIODES

Ralph F. Penoyer, Yorktown Heights, N.Y., assignor to International Business Machines Corporation, New York, N.Y., a corporation of New York Filed June 29, 1961, Ser. No. 123,081
11 Claims. (Cl. 307—88)

The present invention relates generally to the electronic arts and more particularly to logic circuits for use in electronic data processing apparatus or the like.

The logic circuits herein described make use of a particular semiconductor device having a pair of positive resistance regions separated by a negative resistance region in its characteristic curve. A quantum mechanical tunneling principle is involved in providing the negative resistance region. Such a semiconductor device is known in the art as a tunnel diode in reference to the tunneling principle, or an Esaki diode (see, for example, the article by L. Esaki, entitled "New Phenomenon in Narrow Germanium p-n Junction," Physical Review, Volume 109, pages 603 and 604, January 15, 1958).

A previously developed logic circuit uses as a fundamental building block a resonant circuit wherein one of the reactive elements is periodically varied. In one such logic circuit (commonly referred to as the "parametron"), a pair of nonlinear inductors or capacitors are connected together in a balanced configuration with another and linear reactive element. An exciting signal of a frequency $2f_0$ is applied to cause periodic variation in the nonlinear reactive elements of the resonant circuit at the frequency $2f_0$.

The oscillation of the reactive elements at the frequency $2f_0$ spontaneously generates a second subharmonic or parametric oscillation of a frequency $f_0$. The exciting signal of the frequency $2f_0$ serves essentially as a pump signal and supplies the total energy necessary for periodically varying the nonlinear reactive elements of the resonant circuit. The principle of this operation is well known physically and can be shown by Mathier's equation.

The subharmonic or parametric oscillation has the property of being stable in either of two phases which differ by pi radians from each other. Since the parametric oscillation is stable in either of two phases, the resonant circuit can be employed as a fundamental building block of a logic circuit for use in electronic data processing apparatus or the like. One of these phases may represent the binary digit zero, while the other phase may represent the binary digit one. The particular phase of the oscillation of such a resonant circuit will depend upon the phase of an input signal (or the phase of the majority of the input signals) supplied thereto. The basic teachings of the utilization of the two stable phases in digital operations and majority voting are set forth in U.S. Patent No. 2,815,488 to Dr. John Von Neumann which is assigned to the assignee of the present invention. The previously-mentioned parametron is described in the article entitled "The Parametron, A Digital Computing Element Which Utilizes Parametric Oscillation" by Eiichi Goto appearing in the August 1959 issue of the Proceedings of the IRE, pages 1304–1316.

In a logic circuit using resonant circuits, the resonant circuits are usually coupled in a logic chain or shifting register. The exciting signals of the frequency $2f_0$ for adjacent resonant circuits overlap one another but are shifted in time with respect to each other so that the information signal is cascaded through the chain and passes from one resonant stage to the next during the overlap. In order to insure directional transmission of the data through a logic chain, it is necessary to use at least three sequential or recurring bursts of the exciting signals of the frequency $2f_0$ for the successive stages. The data is transmited only during overlap of the exciting signals and the overlap of any stage with its preceding stage must come before and be separated in time from the overlap with the following stages.

Although such logic circuits have been used in electronic data processing apparatus for some time, the same have certain disadvantages which have somewhat limited the use therof. Three overlapping exciting signals of the frequency $2f_0$ must be supplied to each and every portion of the data processing apparatus. The exciting signals must contain sufficient power to periodically vary the nonlinear reactive elements in the logic circuit. Transmission and synchronization problems are encountered in supplying the exciting signals to all portions of the data processing apparatus and such problems are particularly evident in large scale data processing apparatus and/or when high operational speeds are required. Each of the resonant circuits comprises a pair of nonlinear reactive elements, a linear reactive element, a damping resistor, and input and output networks. The large component count of these circuits results in relatively expensive and complicated data processing apparatus.

Briefly, the present invention relates to improved resonant logic circuits for use in digital computers or the like. The fundamental logic block or resonant circuit comprises a tunnel diode connected in series with an inductor element. A capacitor element is provided in parallel with the effective negative resistance of the tunnel diode. The end terminal of the inductor element is referenced to ground while the end terminal of the tunnel diode is connected to a source of direct current clock pulses. Input signals of either of two phases separated by pi radians are coupled to, and output signals representative of the majority phase of the input signals are taken from, the resonant circuit.

Prior to the application of the clock pulse, the tunnel diode is operating in a positive resistance region of its characteristic curve. No changes are evidenced in the output signals sufficient to propagate the information signal through the adjacent resonant circuits. When the clock pulse is applied, the tunnel diode is biased to an operating point in the negative resistance region of its characteristic curve. The resonant circuit oscillates at a frequency determined by the parameters of the circuit elements. The phase of this oscillation is controlled by the majority phase of the input signals. The oscillation will continue until the clock pulse associated with this resonant circuit is removed. A plurality of the resonant circuits are coupled together to provide a logic chain. At least three overlapping and time shifted direct current clock pulses are provided for the directional transmission of data signals through the logic chain in a sequential and directional manner.

The input and output signals are conveniently coupled to the resonant circuit by means of a transformer having a stage and a plurality of input and output windings. This stage winding of the transformer is connected in series with the tunnel diode and, in combination with the leakage inductance of the transformer, defines the inductor element. By properly connecting the windings of the transformer, the resonant circuit performs inversion—the phase of the output signal is separated by pi radians from the phase of the majority of the input signals.

One of the input signals to each of the resonant circuits comprises an alternating current reference signal of a frequency twice the frequency of oscillation of the circuits. This reference signal serves only to prevent cumulative phase shifts in an extended logic chain and is not required where a small number of the resonant circuits are employed. Alternately, the reference signal may be used only in connection with certain portions of the electronic data processing apparatus. The resonant circuits are caused to oscillate by the overlapping direct current clock pulses.

The capacitor element may comprise the internal shunt capacitance of the tunnel diode. In this case, the capacitances of the tunnel diodes of the coupled resonant circuits would be matched or, alternatively, small tuning capacitors would be employed for turning the resonant circuits.

It is the primary or ultimate object of the present invention to provide improved resonant logic circuits employing tunnel diodes wherein the negative resistance characteristics of tunnel diodes in combination with capacitor and inductor elements define resonant circuits.

Another object of this invention is to provide improved resonant logic circuits employing the phases of oscillating signal to represent digital information wherein direct current clock pulses are used for setting and maintaining the resonant circuits in their oscillating states. High frequency pump signals are not required for powering the resonant circuits.

A further object is to provide logic circuits of the type set forth in the above objects wherein transformer means couple input and output signals to the resonant circuits and define the inductor elements therefor. This facilitates the coupling of many input and output signals to each of the resonant circuits while requiring a minimum of components. The windings of the transformer means can be spaced to provide isolation between the input and output windings when the resonant circuits are not oscillating. Further, the inverse function may be obtained from any of the resonant circuits by controlling the polarities of transformer windings.

A still further object of the invention is to provide resonant logic circuits employing tunnel diodes which are characterized by their reliability, high speed and simplicity in operation.

The foregoing and other objects, features and advantages of the invention will be apparent from the following more particular description of preferred embodiments of the invention, as illustrated in the accompanying drawings.

In the drawings:

FIGURE 3 is a graphical representation of the characteristics of one of the tunnel diodes used in the circuit of FIGURE 1 and showing the operation thereof;

FIGURE 4 is a schematic equivalent circuit of one of the resonant circuits of FIGURE 1;

FIGURE 5 is a circuit diagram of one of the resonant circuits showing particularly the relative positioning of the various windings of the coupling transformer; and FIGURE 6 is a schematic wiring diagram of a modified form of a circuit embodying the invention.

Figure 1:
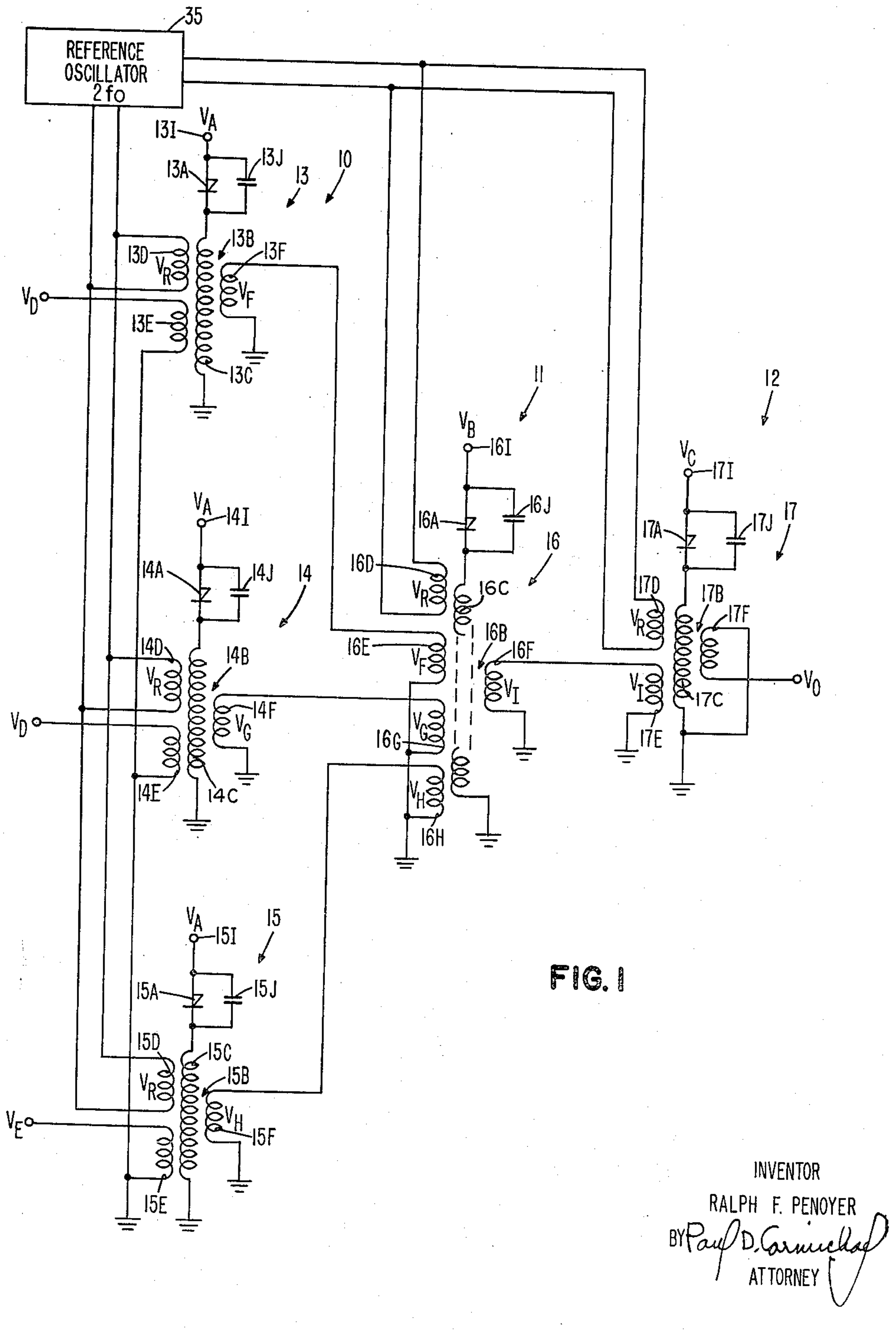
FIGURE 1 is a schematic circuit diagram of a resonant logic circuit employing tunnel diodes embodying the teachings of the present invention.

Referring now to the drawings, and initially to FIGURE 1 thereof, there is shown a logic circuit including the stages 10, 11 and 12. The stage 10 comprises three resonant circuits 13, 14 and 15 while the second and third stages 11 and 12 are defined by resonant circuits 16 and 17, respectively. The resonant circuits 13–17 are generally similar and, to facilitate description, the reference numerals 13–17 followed by the same alphabetic character indicate identical circuit elements. To avoid unnecessary repetition in the specification, only the resonant circuit 13 will be described in detail.

The resonant circuit 13 comprises a tunnel diode 13A coupled in series relation with a transformer 13B. The transformer 13B has a stage winding 13C, a pair of input windings 13D and 13E and an output winding

13F. The stage winding 13C is connected in series relation with respect to the tunnel diode 13A and, in combination with the leakage inductance of the transformer, provides the inductor element for the resonant circuit. The stage winding 13C is also referenced to ground. The resonant circuits 14–17 each comprise a transformer having the same number of windings with the exception of the transformer 16B associated with resonant circuit 16 which has a pair of additional input windings 16G and 16H. The use of the transformers 13B–17B in coupling input, output and reference signals to the resonant circuits, providing isolation between the input and output signals and providing the inverse function of the majority of the input signals will be hereinafter more fully explained.

Figure 2:
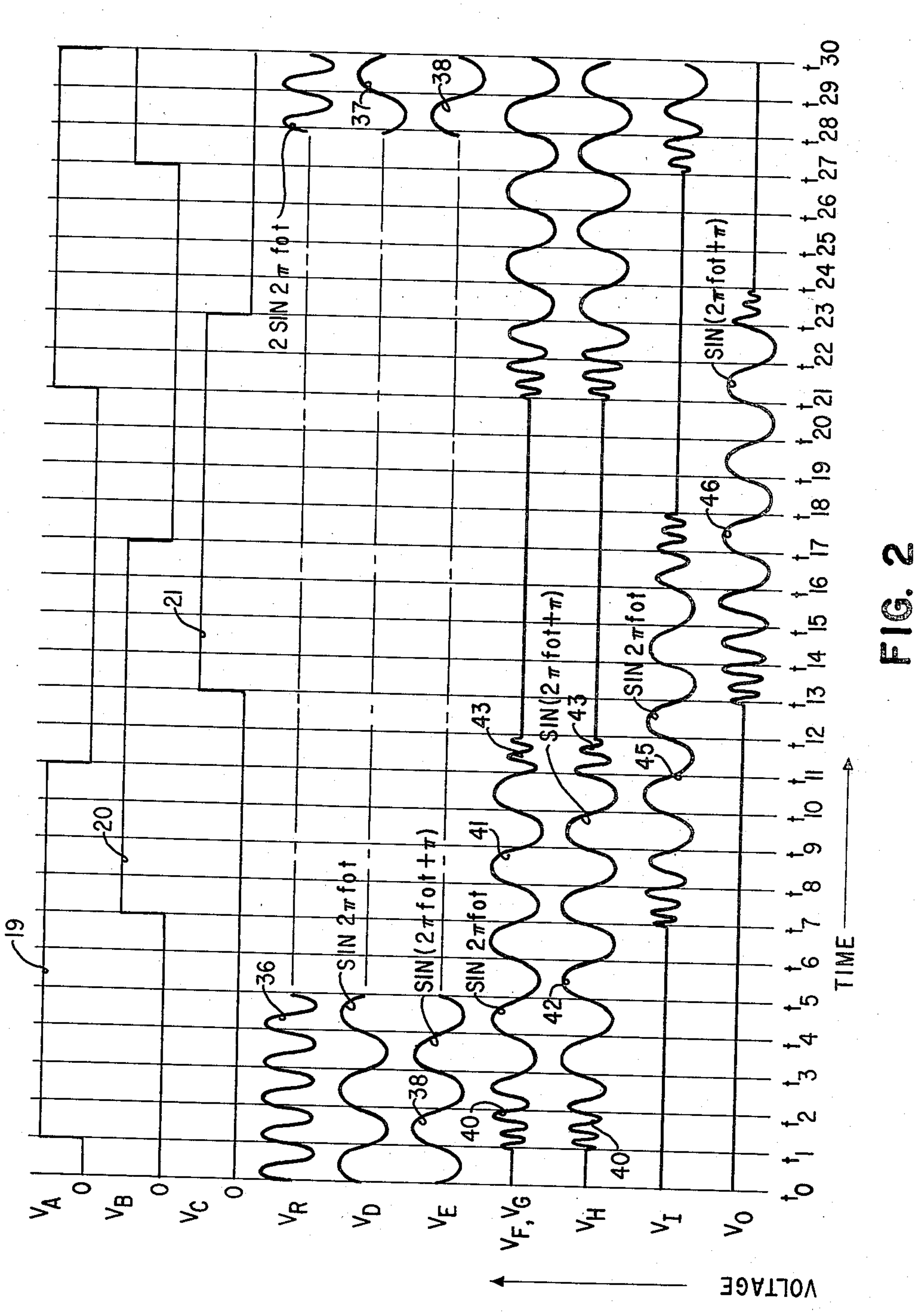
FIGURE 2 is a graphical illustration of the variation with time of the clock pulses and other potentials in the circuit of FIGUR 1.

A positive clock input terminal 13I is provided for the resonant circuit 13 and is coupled with a source of a direct current clock pulse $V_A$. The clock input terminals 14I and 15I of resonant circuits 14 and 15 are also associated with the clock pulse $V_A$ while the clock pulses $V_B$ and $V_C$ are coupled to the clock input terminals of the resonant circuits 16 and 17, respectively. FIGURE 2 shows the various potentials applied to the circuit of FIGURE 1 beginning at time $t_0$. Line 19 corresponds to the clock pulse $V_A$ appearing at the clock input terminals 13I, 14I and 15I. In a similar manner, the lines 20 and 21 represent the clock pulses $V_B$ and $V_C$ at the clock input terminals 16I and 17I, respectively. The clock pulses $V_A$, $V_B$ and $V_C$ are sequential and overlapping. As used in this specification, the word "sequential" means that the leading edges of the clock pulses occur in time sequence, whether or not portions of these pulses overlap.

A capacitor element 13J is connected in parallel or shunting relation with respect to the tunnel diode 13A. The tunnel diodes, the inductor elements and the capacitor elements define the resonant circuits 13–17 which oscillate at a frequency $f_0$ when the tunnel diodes are operating in the negative resistance regions of their characteristic curves.

In FIGURE 3 of the drawings, the curve 23 represents the current-voltage characteristic of the tunnel diode 13A employed in the resonant circuit 13. The curve 23 is a typical tunnel diode characteristic curve and includes a positive resistance region between the origin 24 and peak 25, a negative resistance region 26 between peak 25 and valley 27 and a second positive resistance region to the right of the negative resistance region 26. A vertical line 29 represents the clock pulse $V_A$. It will be noted that the line 29 intersects the characteristic curve 23 in the negative resistance region 26. The tunnel diode 13A appears as a positive resistance element prior to the application of the clock pulse $V_A$. When the clock pulse $V_A$ is applied, the tunnel diode operates in the negative resistance region of its characteristic curve and appears effectively as a negative resistance element. The resonant circuit develops sustained oscillations at a frequency $f_0$ which is determined by the circuit parameters. In a similar manner, the resonant circuits 14 and 15 are triggered to a state of sustained oscillation by the clock pulse $V_A$ while the resonant circuits 16 and 17 oscillate at the frequency $f_0$ when the sequential pulses $V_B$ and $V_C$ are applied thereto.

A circuit electrically equivalent to the resonant circuit 13 is shown in FIGURES 4 of the drawings and may be used for purposes of analysis. This equivalent circuit comprises an inductor 30 representing the stage winding 13C and the leakage inductance of the transformer 13B. The resistance 31 corresponds to the internal and series resistance of the transformer. The capacitance of the capacitor element 13J is represented by capacitor 32 while the tunnel diode 13A is considered to be a variable resistor 33. The clock pulse $V_A$ is applied across the terminals 34. In this equivalent circuit, the tunnel diode is considered only as a variable resistance element—the assumption being that the internal inductance and capacitance of the tunnel diode are negligible compared to the external circuit elements.

By proper circuit analysis, an expression can be obtained for the variation of the voltage across the inductor 30 with respect to time. Assuming that the switching of and the change in current flowing through the tunnel diode occurs very quickly with respect to oscillation buildup, the following equation is derived:

(1)

$$E_L(t) = -A\left(\frac{L_{30}V_A}{R_{33}+R_{31}}\right)e^{-At}\sin\left[\omega_0 t - \tan^{-1}\left(\frac{2\omega_0 R_{33}L_{30}C_{32}}{R_{31}R_{33}C_{32}-L_{30}}\right)\right]$$

Where:

$A$ is equal to the quantity $$\frac{R_{31}R_{33}C_{32}+L_{30}}{2(R_{33}L_{30}C_{32})}$$

$E_L(t)$ is the variation of the voltage with respect to time across the inductor 30;

$\omega_0$ is the resonant frequency equal to $2\pi f_0$; and $t$ is the variable time.

In a similar manner, the equation for the resonant frequency $\omega_0$ is as follows:

(2)

$$\omega_0 = \left(\frac{R_{33}+R_{31}}{R_{33}L_{30}C_{32}} - A^2\right)^{1/2}$$

For the circuit to produce sustained oscillations, the term A must be less than zero. This condition is satisfied by the following inequality:

(3) $$L_{30} > R_{31}R_{33'}C_{32}$$

Where:

$R_{33'}$ is the magnitude of the negative resistance of the tunnel diode and is equal to $-R_{33}$.

It is also desired that the resonant frequency $\omega_0$ be relatively independent of variations in the negative resistance of the tunnel diode. As will be later explained, the operating point of the tunnel diode will vary in accordance with the input signals supplied to the resonant circuit. Further the oscillations of the resonant circuit should build up to the steady state operating condition in the shortest possible time after the clock signal has been applied and the tunnel diode appears effectively as a negative resistance element. The time required for the resonant circuits to reach steady state oscillation will determine, to a certain extent, the overall speed at which the logic circuit can be operated and/or speed at which logical operations can be performed. The above conditions are satisfied by proper selection of circuit parameters to obtain the desired results.

The particular equivalent circuit shown in FIGURE 4 of the drawings and the resultant equations should not be considered as in any way limiting the present invention. Other and more detailed equivalent circuits may be used for analysis and design purposes. For example, the internal inductance and capacitance of the tunnel diode, the interwinding capacitance of the transformer, etc., may be taken into account in a more detailed analysis. The invention, in its broader aspects, specifically envisions using only the internal capacitance of the tunnel diode in lieu of an external capacitor since a minimum $C_{32}R_{33'}$ product provides the shortest buildup time for the oscillations. However, this discussion does demonstrate that, upon proper selection of circuit parameters, the resonant circuits 13–17 oscillate at a predetermined frequency $f_0$ when the clock pulses $V_A$, $V_B$ or $V_C$ are applied to switch the operating points of the tunnel diodes 13A–17A into the negative resistance regions of their characteristic curves.

Each of the transformer windings 13D–17D is connected to an oscillator 35 supplying a reference signal of a frequency twice the frequency of oscillation of the resonant circuits. The reference signal $V_R$ is represented by the line 36 in FIGURE 2 of the drawings. The arrangement is such, as will be hereinafter more fully explained, that the reference signal $V_R$ is coupled to each of the resonant circuits and serves as a means for preventing cumulative phase shifts when the information signal is transferred through the stages 10, 11 and 12.

The input transformers 13E and 14E of the resonant circuits 13 and 14 are coupled with an input signal $V_D$. The input signal $V_D$ is graphically represented by the line 37 in FIGURE 2 of the drawings and varies sinusoidally at a frequency $f_0$ equal to the frequency of oscillation of the circuits 13–17. An input signal $V_E$ is supplied to the transformer winding 15E of the resonant circuit 15. The input signal $V_E$ is designated by the reference numeral 38 and varies in a periodic manner with respect to time equal to the frequency of oscillation $f_0$ of the resonant circuits 13–17. The input signal $V_E$ is separated in phase by pi radians or one hundred and eighty degrees with respect to the input signal $V_D$. For purposes of discussion, it will be assumed that the phase of the input signal $V_D$ represents the binary digit one while the phase of the input signal $V_E$ corresponds to the binary digit zero. However, it should be understood that the digital designations of the input signals may be reversed or, in fact, the phase differences of these input signals may be arbitrarily assigned to represent any desired information quantities.

The output windings 13F, 14F and 15F of stage 10 are directly coupled to the input windings 16E, 16G and 16H, respectively, of the resonant circuit 16. The output signals $V_F$, $V_G$ and $V_H$ from the resonant circuits 13–15 serve as input signals to the second stage 11. The output winding 16F of the second stage in turn is connected to input winding 17E and provides an input signal $V_I$ to the resonant circuit 17. The output winding 17F of the third and last stage 12 defines an output signal $V_O$ for the logic circuit. The stages 10–12 are connected in adjacent coupled relation to define a logic chain or shifting register. In such a logic circuit, the output signals of an intermediate stage serves as input signals to a succeeding stage. Input or drive signals are applied to the first stage and output signals are coupled from the last stage of the logic circuit.

Considering now the operation of the apparatus above described, it will be assumed that initially the clock pulses $V_A$, $V_B$ and $V_C$ are not applied, the input signals $V_D$ and $V_E$ are present and the reference signal $V_R$ is also present. During this time interval ($t_0$—$t_1$ in FIGURE 2 of the drawings), no appreciable output signals will be evidenced from any of the resonant circuits. The tunnel diodes 13A–17A are all operating in the positive resistance regions of their characteristic curves and the resonant circuits do not oscillate.

The input signals $V_D$ and $V_E$ applied to the input windings 13E, 14E and 15E cause the operating points of the tunnel diodes 13A, 14A and 15A to move along their characteristic curves about the origins 24. In a similar manner, the operating points of the tunnel diodes 13A–17A move up and down positive resistance regions of their characteristic curves due to the presence of the reference signal $V_R$. The tunnel diodes appear as positive resistance elements and the resonant circuits do not oscillate in a sustained and underdamped manner. While signals of small voltage level may be coupled from the input windings to an output winding of any resonant circuit, these signals are not of a sufficient value to serve as input signals to succeeding stages of the logic circuit and/or as the resultant output signal. To minimize the effect of the input and reference signals when the clock pulses are not applied and the coupling between the input and output windings of any particular resonant circuit, the arrangement shown in FIGURE 5 of the drawings is employed. The windings 13C–13E of the transformer 13B are each wound in a relatively thin annular shape. The thin annular windings are stacked in vertical relation with respect to each other with the windings 13D—13E and 13F being disposed on opposite sides of the stage winding 13C. The spacing between the stage and output windings is greater than the spacing beween the stage and input windings. The output winding is separated from the stage and the input windings to the extent necessary to prevent objectionable coupling between these windings when the resonant circuit 13 is not oscillating at the frequency $f_0$. For the same purpose, the number of turns of the output winding may be less than the number of turns of the input and stage windings and/or resistors can be used in coupling the output and input windings of the resonant circuits associated with adjacent stages of the logic circuit.

At time $t_1$, the clock pulse $V_A$ rises to a positive level and the operating points of the tunnel diodes 13A–15A are immediately switched to negative resistance regions of their characteristic curves. These tunnel diodes now appear as negative resistance elements and sustained oscillations begin to build up in the resonant circuits 13–15 of the first stage 10. This buildup of oscillations is represented by the transient oscillations 40 extending from times $t_1$ to $t_3$ in the graphs of the output voltages $V_F$ and $V_G$ (line 41) ) and $V_H$ (line 42) shown in FIGURE 2 of the drawings. The oscillating resonant circuits 13–15 provide a large super-regenerative amplification of the input signals when the tunnel diodes appear as negative resistance elements. The input signals $V_D$ and $V_E$ are coupled to the input windings 13E–15E.

Within a very short time interval, the resonant circuits 13–15 arrive at their steady state oscillating condition. This state begins at time $t_4$ and lasts until the clock pulse $V_A$ is removed or goes to the down level at time $t_{11}$. During this time interval, the resonant circuits 13–15 each oscillate at the frequency $f_0$ as determined by the circuit parameters thereof and in a phase corresponding to the phase of the majority of the input signals supplied thereto. The oscillations are readily coupled to the output windings of the transformers 13B–15B. The output signals $V_F$ and $V_G$ oscillate in the same phase as the phase of the input signal $V_D$ and correspond to the binary digit one. The same phase relation is maintained between the input signal $V_E$ and the output signal $V_H$ which represent the binary digit zero.

When the clock pulse $V_A$ goes to the down level at time $t_{11}$, the operating points of the tunnel diodes 13A–15A are shifted to positive resistance regions of their characteristic curves. The oscillations of the resonant circuits 13–15 quickly subside as is indicated at 43 in FIGURE 2 of the drawings. The resonant circuits 13–15 will oscillate at the frequency $f_0$ and in phases dependent upon the phases of the input signals associated therewith whenever the clock pulse $V_A$ is at the positive voltage level.

The output signals $V_F$, $V_G$ and $V_H$ are supplied to the input windings 16E, 16G and 16H associated with resonant circuit 16 defining the second stage 11. At time $t_7$, the clock pulse $V_B$ goes to the up level and the tunnel diode 16A is biased to appear as a negative resistance element. The clock pulses $V_A$ and $V_B$ are sequential and overlap in that the same are raised to positive levels at different times but both are at positive levels during a certain time interval ($t_7$—$t_{11}$). Oscillations begin to build up and a steady state oscillating condition is quickly achieved as is represented by the line 45 in FIGURE 2 of the drawings. The phase of the oscillations of the output signal $V_I$ will depend upon the phase of the majority of the input signals $V_F$, $V_G$ and $V_H$ supplied to the resonant circuit 16. The input signals $V_F$ and $V_G$ correspond to the binary digit one while the signal $V_H$ represents the binary digit zero. As a result, the output signal $V_I$ oscillates in the phase corresponding to the binary digit one. At the end of the clock pulse $V_B$ (time $t_{17}$), the operating point of the tunnel diode 16A is returned to a positive resistance region of its characteristic curve and the oscillations in the output signal $V_I$ quickly subside.

The output signal $V_I$ from the output winding 16F of the resonant circuit 16 of the second stage 11 is supplied to the input winding 17E of the resonant circuit 17 of the third stage 12. The clock pulse $V_C$ rises to a positive level at time $t_{13}$ to shift the operating point of the tunnel diode 17A to the negative resistance region of its characteristic curve. In the same manner as the resonant circuits of the stages 10 and 11, the resonant circuit 17 will oscillate at a frequency $f_0$ in phase with the input signal ($V_I$) supplied thereto. However, the resultant output signal $V_O$ appearing across output winding 17F will vary in the opposite phase as is indicated by line 46 in FIGURE 2 of the drawings. The polarity of the output winding 17F is reversed with respect to polarity of the input windings 17D and 17E. By controlling the polarities between the input and output windings of any resonant stage, a means is provided for conveniently obtaining the inverse of the majority of the input signals.

The reference signal $V_R$ of a frequency $2f_0$ is coupled with each resonant circuit and is employed only to prevent cumulative phase shifts during the propagation of the information from stage to stage. The reference signal $V_R$ causes the resonant circuits to stabilize on one of the two phase states and compensates for phase shifts occurring in the transmission of the information containing signals between the various stages of the logic circuit. In a logic circuit consisting of a relatively small number of stages or in a logic circuit where the cumulative phase shift is not excessive, the reference signal $V_R$ is not required. It is thought that the reference signal causes the nonlinear shunt capacitance of the tunnel diode to oscillate at the frequency $2f_0$ whereby the resultant oscillation of the logic circuit will lock on a phase determined by the phase of the majority of the input signals supplied to the resonant circuit. Regardless of the actual reason for the reference signal causing the resonant circuits to lock on particular phases, the result is to prevent cumulative phase shifts through the logic circuit.

In the above-described logic circuit, the information is propagated from stage to stage during periods of overlap of the sequential and direct current clock pulses. The logic circuit includes the basic Boolean multiplication and addition operations as special cases. If the input to one of the resonant circuits of stage 10 is tied to a signal representing the binary digit one, and the input to each of the other two resonant circuits can be either the binary digit one or zero, the resonant circuit 16 performs a biased majority decision corresponding to the logical Or operation. Similarly, if one of the resonant circuits of the first stage 10 is connected to an input signal representing the binary digit zero, and the input to each of the other two resonant circuits of this stage can assume either of the binary digits, the output signal of resonant circuit 16 will correspond to the logical And operation. The stage 17 performs the complementary or inverting function. A digital system of any desired complexity can be constructed by properly combining the resonant circuits and defining the input signals thereto.

Referring now to FIGURE 6 of the drawings, there is shown a second embodiment of a logic circuit embodying the teachings of the present invention. This logic circuit comprises a pair of stages defined by the resonant circuits 50 and 51. Each of the resonant circuits 50 and 51 has a tunnel diode 52 connected in series with an inductor 53. A clock pulse input terminal 54 is coupled with the clock pulse $V_A$ or $V_B$ while the inductor 53 is referenced to ground. A capacitor element 55 is connected in parallel with the tunnel diode 52. A node 56 is provided between the tunnel diode 52 and the inductor 53 for coupling input signals to and output signals from the resonant circuit.

The reference signal $V_R$ and the input signal $V_D$ are coupled to the node 56 of resonant circuit 50 by resistors 57 and 59, respectively. An output signal $V_F$ is taken from the resonant circuit 50 via conductor 60 and resistor 61 which are connected to the node 56 of the resonant circuit 51. The reference signal $V_R$ and other input signals $V_G$ and $V_H$ are also coupled to the node 56 of the resonant circuit 51 by resistors 62–64. An output signal $V_O$ is taken from the resonant circuit 51 by an output circuit comprising conductor 65 and capacitor 66 which is coupled to the node 56 of this resonant circuit.

The operation of this logic circuit is generally similar to the operation of the logic circuit shown in FIGURE 1 of the drawings. When the clock pulses $V_A$ and $V_B$ are applied, the operating points of the tunnel diodes 52 are shifted to negative resistance regions of their characteristic curves and these circuits begin to oscillate. However, the inductor elements for the resonant circuits are provided by the inductors 53 rather than by the windings and leakage inductances of transformers. Also, the various input and output signals are coupled or taken from the resonant circuits 50 and 51 by means of resistors or capacitors. The resonant circuits oscillate at a frequency $f_0$ determined by the circuit parameters thereof and in the same phase as the phase of the majority of the input signals supplied thereto. The output signals of the resonant circuits are transferred via the coupling elements provided by the resistors or the capacitors to succeeding stages. The outputs from the last stage define resultant output signals. The coupling elements are selected to prevent the propagation of the reference or input signals through the various stages of the logic circuit when the clock pulses are not at their positive voltage levels. Any convenient coupling means may be employed for introducing input signals and taking output signals from the resonant circuits defining the logic circuit. The transformer means previously disclosed does offer advantages in reducing component count, minimizing undesirable coupling of input and output windings and providing the inverse function.

In the disclosed embodiments of the logic circuits, a capacitor element is shown connected in parallel relation with respect to the tunnel diode of each resonant circuit. This capacitor element need not be an external element and may comprise the internal shunting capacitance of the tunnel diode. Such an arrangement may be used where high speed operations are desired. The tunnel diodes would be selected to provide the required capacitance for the particular application. However, it would probably be necessary to match the capacitances of the tunnel diodes in the coupled and adjacent resonant circuits. This can be accomplished by proper selection of the tunnel diodes or the use of small external tuning capacitors.

It should now be apparent that the objects initially set forth have been accomplished. Of particular importance is the provision of resonant logic circuits employing tunnel diodes wherein direct current clock pulses cause the resonant circuits to oscillate. The resonant circuits can be combined to perform any digital operation and have majority voting and branching capabilities comparable to those of other known fundamental logic building blocks.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A circuit for performing logical operations comprising first and second stages, each of said stages having at least one resonant circuit, each of said resonant circuits including a tunnel diode characterized by positive and negative resistance regions in its characteristic curve, an inductor element connected in series with said tunnel diode, a capacitor element connected in parallel with said tunnel diode, a clock pulse input terminal for said resonant circuit, circuit means for supplying input signals to the resonant circuit of said first stage, means interconnecting said first and said second stages, means for taking an output signal from said second stage, means for applying sequential direct current clock pulses to the clock pulse input terminals of said first and second stages, said clock pulses shifting the operating points of said tunnel diodes to the negative resistance regions of their characteristic curves whereby said tunnel diodes effectively appear as negative resistance elements, said resonant circuits oscillating in a sustained manner at a frequency determined by the circuit parameters thereof when said clock pulses are applied, and the phase of oscillation of each of said resonant circuits being determined by the phase of a majority of input signals supplied thereto.

2. Apparatus according to claim 1 further comprising means supplying a reference signal having a frequency equal to twice the frequency of oscillation of said resonant circuits to each of said resonant circuits, said reference signal preventing cumulative phase shifts through said first and second stages.

3. Apparatus according to claim 1 further comprising a transformer for each of said resonant circuits, each of said transformers having stage, input and output windings, said stage winding defining said inductor element, and said input and output windings providing said circuit means, said means interconnecting and said means for taking.

4. Apparatus according to claim 3 further characterized in that said windings of each of said transformers are spaced with respect to each other, the relative spacing between said windings being such as to minimize propagation of the input signals through said first and second stages in the absence of said clock pulses.

5. A circuit for performing logical operations comprising first and second stages, each of said stages having at least one resonant circuit, each of said resonant circuits including a device having a negative resistance region in its characteristic curve, a first reactive element connected in series with said device, a second reactive element connected in parallel with said device, a clock pulse input terminal, means for applying sequential direct current clock pulses to the clock pulse input terminals of said first and second stages, said clock pulses shifting the operating points of the devices so that the same appear as negative resistance elements, said resonant circuits oscillating in a sustained manner at a frequency determined by the circuit parameters thereof when said sequential clock pulses are applied, means for coupling input signals to said resonant circuits, means for coupling output signals from said resonant circuits, means interconnecting the resonant circuits of said first and second stages, and said resonant circuits oscillating in a phase determined by the phase of the majority of the input signals applied thereto.

6. Apparatus according to claim 5 further characterized in that said second reactive element is provided by the internal shunt capacitance of said device for each of said resonant circuits.

7. Apparatus according to claim 5 further characterized in that said device comprises a tunnel diode for each of said resonant circuits.

8. A logic system comprising first and second stages each having at least one resonant circuit, each of said resonant circuits including an input terminal, an output terminal, a clock pulse input terminal, an electrical signal settable element appearing as a posiitve resistance element in one state and a negative resistance element in a second state, means to apply sequential and overlapping clock pulses to said clock pulse input terminals, said clock pulses periodically setting the settable elements in their second states to cause said resonant circuits to oscillate in a sustained manner at a preselected frequency, means to couple input signals to said resonant circuits, means to take output signals from said resonant circuits, and said resonant circuits oscillating in a phase determined by the majority of the input signals supplied thereto whereby information is propagated through said stages.

9. Apparatus according to claim 8 further comprising means to apply a reference signal alternating at a frequency twice the frequency of oscillation of said resonant circuits to minimize cumulative phase shifts through said stages.

10. Apparatus according to claim 8 further comprising a transformer having stage, input and output windings for each of said resonant circuits, said stage winding being connected in series with said settable element to serve as a reactive element, and said input and output windings defining said means to couple and said means to take.

11. Apparatus according to claim 10 further characterized in that said windings are wound in a thin annular shape, said windings being stacked vertically, and the stage winding being positioned intermediate said input and output windings.

No references cited.